United States Patent Office 2,883,539
Patented Apr. 21, 1959

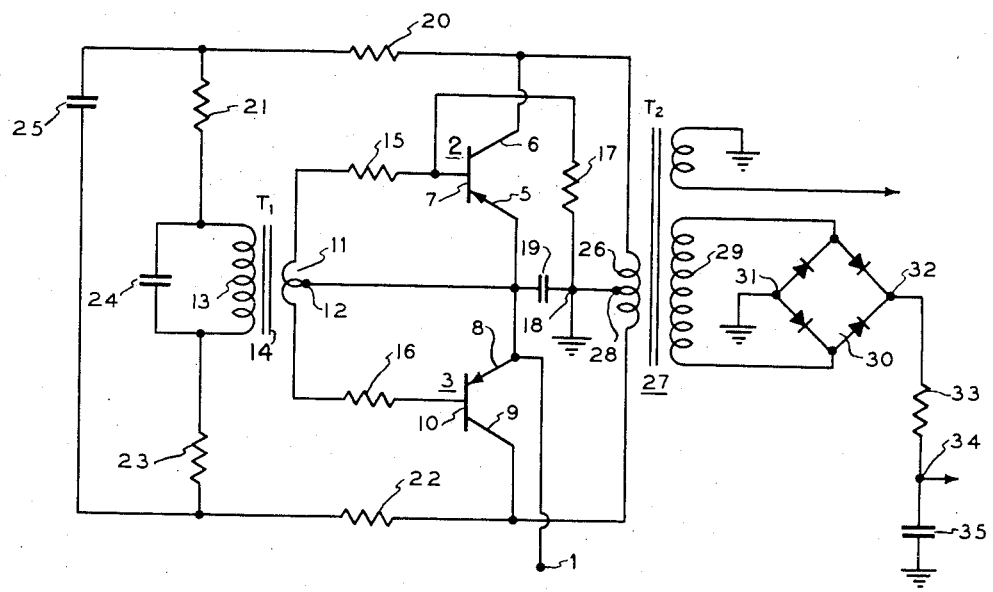

2,883,539

TRANSVERTER

George Bruck, William R. Harter, and Stanley C. Vandoch, Cincinnati, Ohio, assignors to Avco Manufacturing Corporation, Cincinnati, Ohio, a corporation of Delaware Application June 14, 1956, Serial No. 591,480

3 Claims. (Cl. 250—36)

The present invention relates generally to transistorized D.C. to A.C. to D.C. converters, and more particularly to systems for converting D.C. voltage to square wave oscillations by means of a novel transistorized oscillator, and for converting the oscillations to D.C. by means of a full wave rectifier.

Briefly describing the invention, a source of D.C. power is provided, which may be regulated in any convenient fashion, if desired. A transistorized oscillator employing two push-pull connected transistors is provided, which generates a square wave, in order to obtain maximum D.C. to A.C. conversion efficiency. To provide square wave output, the transistors of the oscillator are coupled to a saturable transformer having two alternative saturated states per cycle of operation by such means and in such manner that the transistors are alternately driven between maximum current flow and cut-off in response to attainment of the alternative saturated states of the transformer, and the transistors serve to drive the transformer to its alternative saturated states.

More specifically, the oscillator may employ a pair of PNP junction transistors, connected in push-pull relation in the grounded emitter configuration. The bases are connected in push-pull relation to the secondary winding of the saturable transformer, in series with current limiting resistances. The primary winding of the saturable transformer is connected across the collector electrodes of the transistors, and the collector electrodes as well as the primary winding of the saturable transformer are filtered by a double RC filtering circuit. The saturable transformer is of the step-down type, having a step-down ratio of 5:1, in a specific embodiment of the invention, and serves as a regenerative connection between the collectors and bases of the transistors.

The oscillator is started into oscillation by providing unbalance of base current drains in two transistors of the system, by connecting one only of the bases to ground through a relatively high resistance. The saturable transformer is thus caused to attain or approach one of its stable states in preference to the other. Once current into one of the bases begins to increase, current into the other base must decrease by reason of the balanced connection of the bases to the transformer secondary winding. Increases and decreases of base currents are regenerative, once started, and continue until the transformer saturates. The process of going into saturation terminates the regenerative voltage, since the magnetic flux in the transformer core no longer varies when the saturated portion of the transformer characteristic is reached. At the same time the voltage applied to the bases by the transformer reverses, in response to reduction of magnetic flux in the transformer core on attainment of an approach to saturation, which initiates generation of a succeeding half cycle of output wave form. The primary winding of an output transformer is connected in the oscillator circuit, in balanced relation to the two transistors, and the secondary winding of the transformer is connected to a full-wave rectifier, which supplies the D.C. output power of the system.

The D.C. supply may provide power at relatively low voltage and at relatively high current. The oscillator may operate at relatively high frequency, of the order of 1000 c.p.s., in order to facilitate the design of the output transformer for efficient operation, and to enable its economical fabrication within a limited volume. The oscillator, by virtue of the fact that it generates square waves, is highly efficient in respect to D.C. to A.C. conversion, and the output transformer may be designed for efficient voltage step-up, providing a higher D.C. output voltage on rectification than was available at the D.C. voltage supply.

The oscillator of the system, while particularly useful in D.C. to A.C. converters arranged in accordance with the present invention, may find application per se as an analogue of an electronic tube multivibrator, in any system requiring the efficient generation of periodic square wave forms.

It is, accordingly, a feature of the present invention to provide a novel system for converting D.C. signal at one level to D.C. signal at a different level, by means of a D.C. to A.C. to D.C. conversion sequence.

It is another object of the present invention to provide a novel transistorized D.C. to A.C. to D.C. converter.

A further object of the present invention resides in the provision of a novel transistorized oscillator for generating square wave oscillations.

Another object of the present invention resides in the provision of a square wave push-pull oscillator having two alternative states generated by the interaction of two transistors coupled in push-pull relation by a saturable transformer, transition from one state to the other state occurring in alternation and in response to attainment of alternative states of saturation by the transformer.

It is a further object of the present invention to provide a two transistor system of square wave oscillation in which one transformer is employed for regeneratively effecting transfer of the conductive states of two transistors in alternation from one of maximum current flow to one of minimum current flow, and in which another separate transformer is employed for deriving load current from the oscillator.

The above and still further features, objects, and advantages of the invention will become apparent upon consideration of the following detailed description of a specific embodiment of the invention, especially when taken in conjunction with the accompanying drawings, wherein the single figure of the drawing is a schematic circuit diagram of a converter in accordance with the invention.

Referring now more particularly to the accompanying drawings, the reference numeral 1 denotes a terminal to which is supplied positive D.C. voltage (about 19 v.), from a source of suitable power capability (about 5 watts), which is suitably regulated to maintain constant supply voltage with varying load.

The terminal 1 supplies D.C. power to an oscillator comprising a pair of PNP junction transistors 2, 3. The transistor 2 comprises an emitter 5, a collector 6 and a base 7, while the transistor 3 comprises an emitter 8, a collector 9 and a base 10. The emitters 5, 8 are connected directly to each other and to the terminal 1. While the invention has been disclosed in one specific embodiment as employing PNP transistors, it will be clear that NPN transistors may be employed if desired, provided suitable modification of voltage polarities is provided for.

A saturable transformer $T_1$ including a secondary winding 11 having a center tap 12, a primary winding 13 and a saturable core 14, is included in the oscillator. The center tap 12 is connected directly to the emitters 5, 8, while the outer terminals of the secondary winding 11 are connected respectively to the bases 7, 10. In series with the bases are connected resistors 15, 16, respectively, of about 15 ohms each. The base 7 of transistor 2 is further connected to a point of reference potential 18 by a resistance 17 (2.2K), while the base 10 of transistor 3 is not so connected. The emitters 5, 8 are by-passed to the point of reference potential 18 by a condenser 19 (150 µf.).

The collectors 6, 9 are connected respectively to opposite sides of the primary winding 13, the collector 6 via two series resistances 20, 21, and the collector 9 via two series resistances 22, 23. The several resistances 20–23, inclusive, may each have values of about 56 ohms. Connected directly across the primary winding 13 is a filter condenser 24 (.1 µf.), and connected across the resistances 21, 23 is a further similar condenser 25.

The primary winding 26 of an output transformer 27 is connected at a center tap 28 to the point of reference potential 18, and at its outer terminals, respectively, to the collectors 6, 9. The secondary winding 29 of transformer 27 supplies a full wave rectifier 30, of conventional character per se, having one grounded output terminal 31, and one load terminal 32, which is connected through a series filter resistance 33 to a terminal 34, shunted to ground by a filter condenser 35.

The transformer $T_1$ is a step-down transformer, having a step-down ratio of 5:1, and serves to couple the collectors 6, 9 to the bases 7, 10 of the transistors 2, 3.

In operation, the transistors 2, 3 are driven to saturation in alternation in response to current supplied to the bases 7, 10 by the transformer $T_1$. If it be assumed that the current to base 7 is increasing the current to base 10 will be decreasing, due to the balanced relation of the secondary winding 11. Any increase in current to base 7 is accompanied by an increase of current from collector 6, which is applied to the primary winding 13 of transformer $T_1$. The windings of transformer $T_1$ are so related as to increase the current to base 7 when the current from collector 6 increases, the loop from each collector to the associated base being regenerative. By similar reasoning, the decrease in base current to transistor 3 which accompanies the increase to the base of transistor 2 is regenerative. The increase in current to base 7 increases until the transformer $T_1$ saturates, or approaches saturation, at which time the voltage in the secondary winding 11 rapidly is reduced to zero and then reverses. The sudden decrease in transformer flux which occurs as the transformer goes into saturation implies a reversal in secondary induced voltage, in accordance with the general principle that transformer secondary voltage has a direction determined by the sense of variation of magnetic flux in the core of the transformer i.e. for a given direction of flux the sense of the voltage induced in the secondary winding depends only on whether the flux is increasing or decreasing in magnitude, having one direction for increasing flux and an opposite direction for decreasing flux. The reversed voltage tends to increase current to the base 10 of transistor 3, which causes an increase in current from collector 9. The latter is applied to the primary winding 13 of transformer $T_1$ in such sense as to regenerate the base current to base 10. Accordingly, the system continues in oscillation, once it has been started, the period of oscillation being determined by the time required for the transformer $T_1$ to swing from one of its states of saturation to the other, or from one of the knees of its saturation curve to the other. The collector currents of the transistors 2, 3, likewise proceed alternately from some maximum value to cut-off, in alternation.

Since the currents in the base circuits of transistors 2 and 3 increase and decrease approximately linearly, the outputs of the transistors constitute square wave pulses, which are supplied by the transistors 2, 3 in push-pull relation to the primary winding halves of transformer 27.

The transformer primary is filtered by filter condenser 24, and the collectors 6, 9 by a separate filter condenser 25, the filter condenser 24, 25 operating in conjunction with series resistors 21, 23, and 20, 22 respectively, to provide double RC filter action. The double filtering action is required in order to smooth out the wave-shape of current in the transformer $T_1$, and particularly to eliminate transient spikes occurring as the transformer $T_1$ saturates. These spikes, if not removed, may rise to sufficiently high values to be destructive of the transistors.

The resistor 17 is required in order to unbalance the system sufficiently to start the system, by assuring that on initially connecting the oscillator to a source of supply different values of current will tend to flow in the bases of the separate transistors, assuring that a predetermined one of the transistors will surely be driven to saturation.

The resistor 17 drains a small amount of D.C. current from the base circuit of transistor 2, and therefore a larger current from emitter 5. The drain is sufficient to unbalance the system sufficiently to start the system by driving one transistor to cut-off and the other to saturation. Once the transformer is driven to saturation in one sense, the periodic attainment of saturation in alternate directions, and the actuation of the transistor currents between maximum and cut-off in alternation automatically continues. The resistance 17 is then no longer necessary, and its drain is sufficiently small in comparison with normal base drain as to be inconsequential.

It is normally considered to be bad practice to include a resistance in the base circuit of a transistor operated in the grounded emitter configuration. In the present circuit the resistances 15, 16 are essential in order to limit base current to safe values, and are not deleterious to the system since each transistor alternates between maximum and cut-off.

It is known that the conversion efficiency of a square wave oscillator is greater than that of a sine wave oscillator. It is important in attaining maximum efficiency that the square wave output of the oscillator be clear, and without overshoot at either the leading or lagging edges. The conversion efficiency of an oscillator operating as described may be above 80%, which is equivalent to the conversion efficiency of a free-running multi-vibrator. In fact, the oscillator of the present system is essentially a transistorized multi-vibrator in which transfer of maximum output current from one transistor to the other is accomplished by saturation phenomena in a regenerative or feed-back transformer.

The isolation of the feed-back circuit including transformer $T_1$ from the output transformer 27 possesses the advantage that load changes do not essentially modify the wave shape generated by the oscillator, nor its mode of operation. The efficiency of the system is therefore conserved for a wide range of outputs, and the system does not go out of oscillation on change of load. Furthermore, since the feedback transformer does not carry load current, it may be small and practically loss-free. The transformer $T_1$ need not have a so-called "square" saturation curve, although it may, if desired. The design of the transformer is therefore not critical, it merely being required that the transformer saturate within the current capabilities of the transistors utilized. If the transformer saturates before the transistor reaches its maximum allowable current, which is the normal condition of operation, the maximum possible output of the oscillator is reduced. It is therefore desirable to design the system to attain saturation of transformer $T_1$ under full load conditions, for maximum current rated output of transistors 2 and 3.

While we have described and illustrated one specific example of the present invention it will be clear that variations of the specific details of construction may be resorted to without departing from the true spirit of the invention as defined in the appended claims.

What we claim is:

1. A transistor oscillator including a first transistor having a first emitter, base and collector, a second transistor having a second emitter, base and collector, a power supply connected between said emitters and a point of reference potential so that both transistors are connected in the common-emitter configuration, a feedback transformer having a primary winding, a secondary winding and a saturable core, said secondary winding having a center tap connected to said power supply, said secondary winding having a first end terminal and a second end terminal, a first limiting resistor connecting said first end terminal to said first base, a second limiting resistor connecting said second end terminal to said second base, means conductively connecting said primary winding between said collectors, said core arranged to operate beyond the knee of its saturation curve in response to predetermined current flow in either of said transistors, and a non-saturable output transformer having a primary winding connected between said collectors and parallel to the first-mentioned primary winding, said primary winding of said output transformer having a center tap connected to said point of reference potential.

2. A transistor oscillator in accordance with claim 1, and a double resistance-capacitance filter network for suppressing transient current spikes in the feedback transformer, said network comprising resistance-capacitance filter means in circuit with said collectors and resistance-capacitance filter means in circuit with said primary.

3. The combination in accordance with claim 2 in which the first-mentioned filter means comprises filter resistances in series with and connected to each of said collectors and a filter capacitor connected between said resistances, and in which the second-mentioned filter means comprises another filter capacitor connected across the primary winding of said saturable transformer, and other filter resistances connected in series with said other filter capacitor and the first-named resistances, said other filter resistances being connected to said primary winding.

References Cited in the file of this patent

UNITED STATES PATENTS

| | | |
|---|---|---|
| 2,748,274 | Pearlman | May 29, 1956 |
| 2,774,878 | Jensen | Dec. 18, 1956 |
| 2,783,384 | Bright et al. | Feb. 26, 1957 |
| 2,852,730 | Magnuski | Sept. 16, 1958 |